(12) United States Patent
Pope

(10) Patent No.: US 9,391,841 B2
(45) Date of Patent: Jul. 12, 2016

(54) FAST LINKUP ARBITRATION

(71) Applicant: SOLARFLARE COMMUNICATIONS, INC., Irvine, CA (US)

(72) Inventor: Steve L. Pope, Costa Mesa, CA (US)

(73) Assignee: SOLARFLARE COMMUNICATIONS, INC., Irvine, CA (US)

( * ) Notice: Subject to any disclaimer, the term of this patent is extended or adjusted under 35 U.S.C. 154(b) by 366 days.

(21) Appl. No.: 13/789,238

(22) Filed: Mar. 7, 2013

(65) Prior Publication Data

US 2014/0012961 A1 Jan. 9, 2014

Related U.S. Application Data

(60) Provisional application No. 61/667,539, filed on Jul. 3, 2012, provisional application No. 61/677,365, filed on Jul. 30, 2012.

(51) Int. Cl.
*G06F 15/177* (2006.01)
*H04L 12/24* (2006.01)
*H04L 29/06* (2006.01)
(Continued)

(52) U.S. Cl.
CPC .............. *H04L 41/083* (2013.01); *H04L 69/14* (2013.01); *H04L 69/18* (2013.01); *H04L 69/40* (2013.01); *H04L 69/323* (2013.01)

(58) Field of Classification Search
CPC ....... H04L 12/24; H04L 41/083; H04L 69/18; H04L 69/14; H04L 69/323
See application file for complete search history.

(56) References Cited

U.S. PATENT DOCUMENTS 4,926,415 A  5/1990  Tawara et al.
5,272,599 A  12/1993 Koenen
(Continued)

FOREIGN PATENT DOCUMENTS

EP  620521 A2  10/1994
WO  9913609 A2  3/1999
(Continued)

OTHER PUBLICATIONS

Gordon E. Moore; "Cramming more components onto integrated circuits," Electronics, vol. 38, No. 8, 4 pages, Apr. 1, 1965.
(Continued)

*Primary Examiner* — Benjamin M Thieu
(74) *Attorney, Agent, or Firm* — Haynes Beffel & Wolfeld LLP; Warren S. Wolfeld

(57) ABSTRACT

A data processing system comprising: first and second network ports each operable to support a network connection configured according to one or more of a predetermined set of physical layer protocols; and a processor configured to, on a network message being formed for transmission to a network endpoint accessible over either of the first and second network ports: estimate the total time required to, for each of the predetermined set of physical layer protocols, negotiate a respective network connection and transmit the entire network message over that respective network connection; select the physical layer protocol having the lowest estimate of the total time required to negotiate a respective network connection and transmit the network message over that respective network connection; and configure at least one of the first and second network ports to use the selected physical layer protocol.

35 Claims, 2 Drawing Sheets

(51) Int. Cl.
*H04L 29/14* (2006.01)
*H04L 29/08* (2006.01)

(56) References Cited

U.S. PATENT DOCUMENTS

| | | | |
|---|---|---|---|
| 5,325,532 A | 6/1994 | Crosswy et al. | |
| 5,805,600 A * | 9/1998 | Venters et al. | 370/477 |
| 5,946,189 A | 8/1999 | Koenen et al. | |
| 6,098,112 A | 8/2000 | Ishijima et al. | |
| 6,160,554 A | 12/2000 | Krause | |
| 6,304,945 B1 | 10/2001 | Koenen | |
| 6,349,035 B1 | 2/2002 | Koenen | |
| 6,438,130 B1 | 8/2002 | Kagan et al. | |
| 6,456,594 B1 * | 9/2002 | Kaplan et al. | 370/238 |
| 6,502,203 B2 | 12/2002 | Barron et al. | |
| 6,530,007 B2 | 3/2003 | Olarig et al. | |
| 6,667,918 B2 | 12/2003 | Leader et al. | |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,904,534 B2 | 6/2005 | Koenen | |
| 6,950,961 B2 | 9/2005 | Krause et al. | |
| 6,978,331 B1 | 12/2005 | Kagan et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,502,826 B2 | 3/2009 | Barron et al. | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,636,703 B2 | 12/2009 | Taylor | |
| 7,650,386 B2 | 1/2010 | McMahan et al. | |
| 7,653,754 B2 | 1/2010 | Kagan et al. | |
| 7,688,853 B2 | 3/2010 | Santiago et al. | |
| 7,702,629 B2 | 4/2010 | Cytron et al. | |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,848,322 B2 | 12/2010 | Oved | |
| 7,856,488 B2 | 12/2010 | Cripe et al. | |
| 7,864,787 B2 | 1/2011 | Oved | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,945,528 B2 | 5/2011 | Cytron et al. | |
| 7,954,114 B2 | 5/2011 | Chamberlain et al. | |
| 7,978,606 B2 | 7/2011 | Buskirk et al. | |
| 8,000,336 B2 | 8/2011 | Harel | |
| 8,156,101 B2 | 4/2012 | Indeck et al. | |
| 8,326,816 B2 | 12/2012 | Colle et al. | |
| 2002/0059052 A1 | 5/2002 | Bloch et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0156784 A1 | 10/2002 | Hanes et al. | |
| 2003/0007165 A1 | 1/2003 | Hudson | |
| 2003/0033588 A1 | 2/2003 | Alexander | |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0086300 A1 | 5/2003 | Noyes et al. | |
| 2003/0172330 A1 | 9/2003 | Barron et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2004/0015502 A1 | 1/2004 | Alexander et al. | |
| 2004/0071250 A1 | 4/2004 | Bunton et al. | |
| 2004/0141642 A1 | 7/2004 | Zeng et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210754 A1 | 10/2004 | Barron et al. | |
| 2004/0249998 A1 | 12/2004 | Rajagopalan et al. | |
| 2004/0252685 A1 | 12/2004 | Kagan et al. | |
| 2005/0008223 A1 | 1/2005 | Zeng et al. | |
| 2005/0018221 A1 | 1/2005 | Zeng et al. | |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066333 A1 | 3/2005 | Krause et al. | |
| 2005/0172181 A1 | 8/2005 | Huliehel | |
| 2005/0219278 A1 | 10/2005 | Hudson | |
| 2005/0219314 A1 | 10/2005 | Donovan et al. | |
| 2005/0231751 A1 | 10/2005 | Wu et al. | |
| 2006/0026443 A1 | 2/2006 | McMahan et al. | |
| 2006/0045098 A1 | 3/2006 | Krause | |
| 2006/0085541 A1 * | 4/2006 | Cuomo et al. | 709/224 |
| 2006/0126619 A1 | 6/2006 | Teisberg et al. | |
| 2006/0165074 A1 | 7/2006 | Modi et al. | |
| 2006/0193318 A1 | 8/2006 | Narasimhan et al. | |
| 2006/0228637 A1 | 10/2006 | Jackson et al. | |
| 2006/0248191 A1 | 11/2006 | Hudson et al. | |
| 2007/0188351 A1 | 8/2007 | Brown et al. | |
| 2007/0220183 A1 | 9/2007 | Kagan et al. | |
| 2007/0237327 A1 | 10/2007 | Taylor et al. | |
| 2007/0260602 A1 | 11/2007 | Taylor | |
| 2007/0277036 A1 | 11/2007 | Chamberlain et al. | |
| 2008/0024586 A1 | 1/2008 | Barron | |
| 2008/0039055 A1 * | 2/2008 | Hannikainen et al. | 455/414.1 |
| 2008/0109526 A1 | 5/2008 | Subramanian et al. | |
| 2008/0115216 A1 | 5/2008 | Barron et al. | |
| 2008/0115217 A1 | 5/2008 | Barron et al. | |
| 2008/0126509 A1 | 5/2008 | Subramanian et al. | |
| 2008/0147828 A1 | 6/2008 | Enstone et al. | |
| 2008/0148400 A1 | 6/2008 | Barron et al. | |
| 2008/0177890 A1 | 7/2008 | Krause et al. | |
| 2008/0244060 A1 | 10/2008 | Cripe et al. | |
| 2008/0301406 A1 | 12/2008 | Jacobson et al. | |
| 2008/0304519 A1 | 12/2008 | Koenen et al. | |
| 2009/0046575 A1 * | 2/2009 | Thiagarajan et al. | 375/240 |
| 2009/0060197 A1 | 3/2009 | Taylor et al. | |
| 2009/0116503 A1 * | 5/2009 | Sebastian | 370/412 |
| 2009/0165003 A1 | 6/2009 | Jacobson et al. | |
| 2009/0182683 A1 | 7/2009 | Taylor et al. | |
| 2009/0201926 A1 | 8/2009 | Kagan et al. | |
| 2009/0213856 A1 | 8/2009 | Paatela et al. | |
| 2009/0268612 A1 | 10/2009 | Felderman et al. | |
| 2009/0287628 A1 | 11/2009 | Indeck et al. | |
| 2009/0302923 A1 | 12/2009 | Smeloy et al. | |
| 2010/0088437 A1 | 4/2010 | Zahavi | |
| 2010/0138840 A1 | 6/2010 | Kagan et al. | |
| 2010/0169880 A1 | 7/2010 | Haviv et al. | |

(56) References Cited

U.S. PATENT DOCUMENTS

| | | |
|---|---|---|
| 2010/0188140 A1 | 7/2010 | Smeloy |
| 2010/0189206 A1 | 7/2010 | Kagan |
| 2010/0198850 A1 | 8/2010 | Cytron et al. |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0040701 A1 | 2/2011 | Singla et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0184844 A1 | 7/2011 | Parsons et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0246052 A1 | 9/2012 | Taylor et al. |
| 2013/0000700 A1 | 1/2013 | Lee |

FOREIGN PATENT DOCUMENTS

| | | |
|---|---|---|
| WO | 2001048972 A1 | 7/2001 |
| WO | 2002035838 A1 | 5/2002 |
| WO | 2008127672 A2 | 10/2008 |
| WO | 2009134219 A1 | 11/2009 |
| WO | 2009136933 A1 | 11/2009 |
| WO | 2010020907 A2 | 2/2010 |
| WO | 2010087826 A1 | 8/2010 |
| WO | 2011043769 A1 | 4/2011 |
| WO | 2011053305 A1 | 5/2011 |
| WO | 2011053330 A1 | 5/2011 |

OTHER PUBLICATIONS

Jack B. Dennis and Earl C. Van Horn; "Programming Semantics for Multiprogrammed Computations," Communications of the ACM, vol. 9, No. 3, pp. 143-155, Mar. 1966.

Marvin Zelkowitz; "Interrupt Driven Programming," Communications of the ACM, vol. 14, No. 6, p. 417-418, Jun. 1971.

J. Carver Hill; "Synchronizing Processors with Memory-Content-Generated Interrupts," Communications of the ACM, vol. 16, No. 6, p. 350-351, Jun. 1973.

F.F. Kuo; "The Aloha System," ACM Computer Communication Review, vol. 4, No. 1, pp. 5-8, Jan. 1974.

Vinton Cerf, Robert Kahn; "A Protocol for Packet Network Intercommunication," IEEE Transactions on Communications, vol. COM-22, No. 5, 13 pages, May 1974.

V. Cerf, et al.; "Proposal for an International End-to-End Protocol," ACM Computer Communication Review, vol. 6 No. 1, pp. 63-89, Jan. 1976.

Robert M. Metcalfe and David R. Boggs; "Ethernet: distributed packet switching for local computer networks," Communications of the ACM, vol. 19, Issue 7, pp. 395-404, Jul. 1976.

P. Kermani and L. Kleinrock; "Virtual cut-through: A new computer communciation switching technique," Computer Networks, vol. 3, No. 4, pp. 267-286, Sep. 1979.

John M. McQuillan, et al.; "An Overview of the New Routing Algorithm for the ARPANET," Proceedings of the 6th Data Communications Symposium, pp. 54-60, Nov. 1979.

Andrew D. Birrell, et al.; "Grapevine: An Exercise in Distributed Computing," Communications of the ACM, vol. 25, Issue 4, pp. 260-274, Apr. 1982.

Ian M. Leslie, et al.; "The Architecture of the Universe Network," ACM Computer Communication Review, vol. 14, No. 2, pp. 2-9, Jun. 1984.

John Nagle; "Congestion Control in IP/TCP Internetworks," ACM Computer Communication Review, vol. 14, No. 4, p. 11-17, Oct. 1984.

Robert M. Brandriff, et al.; "Development of a TCP/IP for the IBM/370," ACM Computer Communication Review, vol. 15, No. 4, pp. 2-8, Sep. 1985.

C. Kline; "Supercomputers on the Internet: A Case Study," ACM Computer Communication Review, vol. 17, No. 5, pp. 27-33, Aug. 1987.

Christopher A. Kent, Jeffrey C. Mogul; "Fragmentation Considered Harmful," ACM Computer Communication Review, vol. 17, No. 5, pp. 75-87, Oct. 1987.

Gary S. Delp, et al.; "An Analysis of Memnet: An Experiment in High-Speed Shared-Memory Local Networking," ACM Computer Communication Review, vol. 18, No. 4, p. 165-174, Aug. 1988.

David R. Boggs, et al.; "Measured Capacity of an Ethernet: Myths and Reality," ACM Computer Communication Review, vol. 18, No. 4, pp. 222-234, Aug. 1988.

H. Kanakia and D. Cheriton; "The VMP Network Adapter Board (NAB): High-Performance Network Communication for Multiprocessors," ACM Computer Communication Review, vol. 18, No. 4, pp. 175-187, Aug. 1988.

V. Jacobson; "Congestion Avoidance and Control," ACM Computer Communication Review, vol. 18, No. 4, pp. 157-173, Aug. 1988.

David D. Clark; "The Design Philosophy of the DARPA Internet Protocols," ACM Computer Communication Review, vol. 18, No. 4, pp. 102-111, Aug. 1988.

Paul V. Mockapetris, Kevin J. Dunlap; "Development of the Domain Name System," ACM Computer Communication Review, vol. 18, No. 4, pp. 112-122, Aug. 1988.

Margaret L. Simmons and Harvey J. Wasserman; "Performance Comparison of the Cray-2 and Cray X-MP/416 Supercomputers," Proceedings of the 1988 ACM/IEEE conference on Supercomputing, pp. 288-295, Orlando, Florida; Nov. 12, 1988.

David A. Borman; "Implementing TCP/IP on a Cray computer," ACM Computer Communication Review, vol. 19, No. 2, pp. 11-15, Apr. 1989.

R. Braden, et al.; "Computing the Internet Checksum," ACM Computer Communication Review, vol. 19, No. 2, pp. 86-94, Apr. 1989.

David D. Clark, et al.; "An Analysis of TCP Processing Overhead," IEEE Communications Magazine, vol. 27, No. 6, pp. 23-29, Jun. 1989.

David R. Cheriton; "Sirpent: A High-Performance Internetworking Approach," ACM Computer Communication Review, vol. 19, No. 4, pp. 158-169, Sep. 1989.

Derek Robert McAuley; "Protocol Design for High Speed Networks," PhD Thesis, University of Cambridge, 104 pages, Sep. 1989.

Craig Partridge; "How Slow Is One Gigabit Per Second ?," ACM Computer Communication Review, vol. 20, No. 1, pp. 44-53, Jan. 1990.

D. D. Clark and D. L. Tennenhouse; "Architectural Considerations for a New Generation of Protocols," ACM Computer Communication Review, vol. 20, No. 4, pp. 200-208, Sep. 1990.

Eric C. Cooper, et al.; "Protocol Implementation on the Nectar Communication Processor," ACM Computer Communication Review, vol. 20, No. 4, 10 pages, Sep. 1990.

Bruce S. Davie; "A Host-Network Interface Architecture for ATM," ACM Computer Communication Review, vol. 21, No. 4, pp. 307-315, Sep. 1991.

C. Brendan S. Traw, et al.; "A High-Performance Host Interface for ATM Networks," ACM Computer Communication Review, vol. 21, No. 4, pp. 317-325, Sep. 1991.

Ian Leslie and Derek R. McAuley; "Fairisle: An ATM Network for the Local Area," ACM Computer Communication Review, vol. 21, No. 4, pp. 327-336, Sep. 1991.

Mark Hayter, Derek McAuley; "The Desk Area Network," ACM Operating Systems Review, vol. 25, Issue 4, pp. 1-11, Oct. 1991.

Gregory G. Finn; "An Integration of Network Communication with Workstation Architecture," ACM Computer Communication Review, vol. 21, No. 5, 12 pages, Oct. 1991.

(56) References Cited

OTHER PUBLICATIONS

Greg Chesson; "The Evolution of XTP," Proceedings of the Third International Conference on High Speed Networking, pp. 1-10, Nov. 1991.

Michael J. Dixon; "System support for multi-service traffic," University of Cambridge Computer Laboratory Technical Report, No. 245, pp. 1-108, Jan. 1992.

Danny Cohen, Gregory Finn, Robert Felderman, Annette DeSchon; "ATOMIC: A Local Communication Network Created Through Repeated Application of Multicomputing Components," Provided by Authors, pp. 1-21, Jan. 10, 1992.

Gene Tsudik; "Message Authentication with One-Way Hash Functions," ACM Computer Communication Review, vol. 22, No. 5, pp. 29-38, Oct. 1992.

Peter Steenkiste; "Analyzing Communication Latency using the Nectar Communication Processor," ACM Computer Communication Review, vol. 22, No. 4, pp. 199-209, Oct. 1992.

Paul E. McKenney and Ken F. Dove; "Efficient Demultiplexing of Incoming TCP Packets," ACM Computer Communication Review, vol. 22, No. 4, pp. 269-279, Oct. 1992.

Erich Ruetsche and Matthias Kaiserswerth; "TCP/IP on the Parallel Protocol Engine," Proceedings of the IFIP TC6/WG6.4 Fourth International Conference on High Performance Networking IV; pp. 119-134. Dec. 14, 1992.

C. Traw and J. Smith; "Hardware/Software organization of a high performance ATM host interface," IEEE Journal on Selected Areas in Communications, pp. 1-22, Feb. 1993.

E. Ruetsche; "The Architecture of Gb/s Multimedia Protocol Adapter," ACM Computer Communication Review, vol. 23, No. 3, pp. 59-68, Jul. 1993.

Jonathan M. Smith and C. Brendan S. Traw; "Giving Applications Access to Gb/s Networking," IEEE Network, vol. 7, Issue 4, 14 pages, Jul. 1993.

Jeffrey R. Michel; "The Design and Evaluation of an Off-Host Communications Protocol Architecture," MSci Thesis, University of Virginia, 144 pages, Aug. 1993.

Mark David Hayter; "A Workstation Architecture to Support Multimedia," PhD Thesis, University of Cambridge, 111 pages, Sep. 1993.

Jonathan Kay and Joseph Pasquale; "The Importance of Non-Data Touching Processing Overheads in TCP/IP," ACM Computer Communication Review, vol. 23, No. 4, 10 pages, Oct. 1993.

W. E. Leland, et al.; "On the Self-Similar Nature of Ethernet Traffic," ACM Computer Communication Review, vol. 23, No. 4, pp. 183-193, Oct. 1993.

C. A. Thekkath, et al.; "Implementing Network Protocols at User Level," ACM Computer Communication Review, vol. 23, No. 4, pp. 64-132, Oct. 1993.

Raj K. Singh, et al.; "A Programmable HIPPI Interface for a Graphics Supercomputer," Proceedings of the 1993 ACM/IEEE conference on Supercomputing, pp. 124-132, Portland, Oregon; Nov. 15, 1993.

Peter Druschel and Larry L. Peterson; "Fbufs: A High-Bandwidth Cross-Domain Transfer Facility," ACM Operating Systems Review, vol. 27, Issue 5, pp. 189-202, Dec. 1993.

Matthias Kaiserswerth; "The Parallel Protocol Engine," IEEE/ACM Transactions in Networking vol. 1, Issue 6, pp. 650-663, Dec. 1993.

Chris Maeda, Brian Bershad; "Protocol Service Decomposition for High-Performance Networking," ACM Operating Systems Review, vol. 27, Issue 5, 12 pages, Dec. 1993.

Greg Regnier, et al.; ETA: Experience with an Intel Xeon Processor as a Packet Processing EngineIEEE Micro, vol. 24, No. 1, pp. 24-31, Jan. 1994.

J. Vis; "A Simple LAN Performance Measure," ACM Computer Communication Review, vol. 24, No. 1, pp. 7-11, Jan. 1994.

Danny Cohen, Gregory Finn, Robert Felderman, Annette DeSchon; "ATOMIC: A High-Speed Local Communication Architecture," Journal of High Speed Networks; pp. 1-11, Jan. 3, 1994.

Gregory G. Finn and Paul Mockapetris; "Netstation Architecture Multi-Gigabit Workstation Network Fabric," Proceedings of InterOp '94, Las Vegas, Nevada; pp. 1-9, May 1994.

Stuart Wray, et al.; "The Medusa Applications Environment," Proceedings of the International Conference on Multimedia Computing and Systems, Boston, MA, 9 pages, May 1994.

Various forum members; "MPI: A Message-Passing Interface Standard," Message-Passing Interface Forum, University of Tennessee, Knoxville, 236 pages, May 5, 1994.

Raj K. Singh, et al.; "A Programmable Network Interface for a Message-Based Multicomputer," ACM Computer Communication Review, vol. 24, No. 3, pp. 8-17, Jul. 1994.

P. Druschel, et al.; "Experiences with a High-Speed Network Adaptor: A Software Perspective," ACM Computer Communication Review, vol. 24, No. 4, pp. 2-13, Oct. 1994.

Sally Floyd; "TCP and Explicit Congestion Notification," ACM Computer Communication Review, vol. 24, No. 5, p. 8-23, Oct. 1994.

A. Edwards, et al.; "User-Space Protocols Deliver High Performance to Applications on a Low-Cost Gb/s LAN," ACM Computer Communication Review, vol. 24, No. 4, pp. 14-23, Oct. 1994.

L. S. Brakmo, et al.; "TCP Vegas: New Techniques for Congestion Detection and Avoidance," ACM Computer Communication Review, vol. 24, No. 4, pp. 24-35, Oct. 1994.

A. Romanow and S. Floyd; "The Dynamics of TCP Traffic over ATM Networks," ACM Computer Communication Review, vol. 24, No. 4, pp. 79-88, Oct. 1994.

R. J. Black, I. Leslie, and D. McAuley; "Experiences of Building an ATM Switch for the Local Area," ACM Computer Communication Review, vol. 24, No. 4, pp. 158-167, Oct. 1994.

Babak Falsafi, et al.; "Application-Specific Protocols for User-Level Shared Memory," Proceedings of the 1994 conference on Supercomputing, pp. 380-389, Washington D.C.; Nov. 14, 1994.

Mengjou Lin, et al.; "Performance of High-Speed Network I/O Subsystems: Case Study of a Fibre Channel Network," Proceedings of the 1994 conference on Supercomputing, Washington D.C.; pp. 174-183, Nov. 14, 1994.

Nanette J. Boden, et al.; "Myrinet: A Gigabit-per-Second Local-Area Network," Draft of paper published in IEEE Micro, vol. 15, No. 1, pp. 1-15, Nov. 16, 1994.

Thomas Sterling, et al.; "Beowolf: A Parallel Workstation for Scientific Computation," Proceedings of the 24th International Conference on Parallel Processing, pp. 1-4, Aug. 1995.

K. Kleinpaste, P. Steenkiste, B. Zill; "Software Support for Outboard Buffering and Checksumming," ACM Computer Communication Review, vol. 25, No. 4, pp. 87-98, Oct. 1995.

C. Partridge, J. Hughes, J. Stone; "Performance of Checksums and CRCS over Real Data," ACM Computer Communication Review, vol. 25, No. 4, pp. 68-76, Oct. 1995.

A. Edwards, S. Muir; "Experiences Implementing a High-Performance TCP in User-Space," ACM Computer Communication Review, vol. 25, No. 4, pp. 196-205, Oct. 1995.

J. C. Mogul; "The Case for Persistent-Connection HTTP," ACM Computer Communication Review, vol. 25, No. 4, pp. 299-313, Oct. 1995.

Thorsten von Eicken, et al.; "U-Net: A User-Level Network Interface for Parallel and Distributed Computing," ACM Operating Systems Review, vol. 29, Issue 5, pp. 40-53, Dec. 1995.

D. L. Tennenhouse, D. J. Wetherall; "Towards an Active Network Architecture," ACM Computer Communication Review, vol. 26, No. 2, pp. 5-18, Apr. 1996.

Paul Ronald Barham; "Devices in a Multi-Service Operating System," PhD Thesis, University of Cambridge, 142 pages, Jul. 1996.

Chi-Chao Chang, et al.; "Low-Latency Communication on the IBM RISC System/6000 SP," Proceedings of the 1996 ACM/IEEE conference on Supercomputing, Pittsburgh, pp. 1-17, Nov. 17, 1996.

Joe Touch, et al.; "Experiences with a Production Gigabit LAN," Gigabit Networking Workshop '97 Meeting, Kobe, Japan, 10 pages, Apr. 1997.

Joe Touch, et al.; "Host-based Routing Using Peer DMA," Gigabit Networking Workshop '97 Meeting, Kobe, Japan, 2 pages, Apr. 1997.

O. Angin, et al.; "Report on the 5th IFIP Internation Workshop on Quality of Service (IWQOS 97)," ACM Computer Communication Review, vol. 27, No. 3, pp. 100-117, Jul. 1997.

Charles P. Thacker and Lawrence C. Stewart; "Firefly: a Multiprocessor Workstation," ACM Operating Systems Review, vol. 21, Issue 4, pp. 164-172, Oct. 1987.

(56) References Cited

OTHER PUBLICATIONS

Ed Anderson, et al.; "Performance of the CRAY T3E Multiprocessor," Proceedings of the 1997 ACM/IEEE conference on Supercomputing, pp. 1-17, San Jose, California; Nov. 16, 1997.
Harvey J. Wassermann, et al.; "Performance Evaluation of the SGI Origin2000: A Memory-Centric Characterization of LANL ASCI Applications," Proceedings of the 1997 ACM/IEEE conference on Supercomputing, pp. 1-11, San Jose, California; Nov. 16, 1997.
Philip Buonadonna, et al.; "An Implementation and Analysis of the Virtual Interface Architecture," Proceedings of the 1998 ACM/IEEE conference on Supercomputing, Orlando, Florida, 20 pages, Nov. 7, 1998.
Parry Husbands and James C. Hoe; "MPI-StarT: Delivering Network Performance to Numerical Applications," Proceedings of the 1998 ACM/IEEE conference on Supercomputing, Orlando, Florida, 15 pages, Nov. 7, 1998.
Michael S. Warren, et al.; "Avalon: An Alpha/Linux Cluster Achieves 10 Gflops for $150k," Proceedings of the 1998 ACM/IEEE conference on Supercomputing, Orlando, Florida, pp. 1-10, Nov. 7, 1998.
John Salmon, et al.; "Scaling of Beowulf-class Distributed Systems," Proceedings of the 1998 ACM/IEEE Conference on Supercomputing, Orlando, Florida, pp. 1-18, Nov. 7, 1998.
Boon S. Ang, et al.; "StarT-Voyager: A Flexible Platform for Exploring Scalable SMP Issues," Proceedings of the 1998 ACM/IEEE conference on Supercomputing, Orlando, Florida, 19 pages, Nov. 7, 1998.
S. L. Pope, et al.; "Enhancing Distributed Systems with Low-Latency Networking," Parallel and Distributed Computing and Networks, Brisbane, Australia, pp. 1-12, Dec. 1998.
M. de Vivo, et al.; "Internet Vulnerabilities Related to TCP/IP and T/TCP," ACM Computer Communication Review, vol. 29, No. 1, pp. 81-85, Jan. 1999.
M. Allman; "TCP Byte Counting Refinements," ACM Computer Communication Review, vol. 29, No. 3, pp. 14-22, Jul. 1999.
Steve Muir and Jonathan Smith; "Piglet: A Low-Intrusion Vertical Operating System," Technical Report MS-CIS-00-04, University of Pennsylvania, 2000, pp. 1-15, Jan. 2000.
Patrick Crowley, et al.; "Characterizing Processor Architectures for Programmable Network Interfaces," Proceedings of the 14th international conference on Supercomputing, Santa Fe, New Mexico, 12 pages, May 8, 2000.
Jonathan Stone, Craig Partridge; "When the CRC and TCP Checksum Disagree," ACM Computer Communication Review, vol. 30, No. 4, 11 pages, Oct. 2000.
W. Feng and P. Tinnakornsrisuphap; "The Failure of TCP in High-Performance Computational Grids," Proceedings of the 2000 ACM/IEEE conference on Supercomputing, Dallas, Texas, 11 pages, Nov. 4, 2000.
Jenwei Hsieh, et al.; "Architectural and Performance Evaluation of GigaNet and Myrinet Interconnects on Clusters of Small-Scale SMP Servers," Proceedings of the 2000 ACM/IEEE conference on Supercomputing, Dallas, Texas, pp. 1-9, Nov. 4, 2000.
Ian Pratt and Keir Fraser; "Arsenic: A User-Accessible Gigabit Ethernet Interface," Proceedings of IEEE Infocom 2001, pp. 1-11; Apr. 22, 2001.
Bilic Hrvoye, et al.; "Deferred Segmentation for Wire-Speed Transmission of Large TCP Frames over Standard GbE Networks," Proceedings of the 9th Symposium on High Performance Interconnects, 5 pages, Aug. 22, 2001.
Bilic Hrvoye, et al.; "Presentation given at HOTI'01," 9th Symposium on High Performance Interconnects, 9 pages, Aug. 22, 2001.
Bruce Lowekamp, et al.; "Topology Discovery for Large Ethernet Networks," ACM Computer Communication Review, vol. 31, No. 4, pp. 237-248, Oct. 2001.
Piyush Shivam, et al.; "EMP: Zero-copy OS-bypass NIC-driven Gigabit Ethernet Message Passing," Proceedings of the 2001 ACM/IEEE conference on Supercomputing, Denver, CO, pp. 1-8, Nov. 10, 2001.
Robert Ross, et al.; "A Case Study in Application I/O on Linux Clusters," Proceedings of the 2001 ACM/IEEE conference on Supercomputing, Denver, CO, 17 pages, Nov. 10, 2001.
E. Blanton and M. Allman; "On Making TCP More Robust to Packet Reordering," ACM Computer Communication Review, vol. 32, No. 1, pp. 20-30, Jan. 2002.
Murali Rangarajan, et al.; "TCP Servers: Offloading TCP Processing in Internet Servers. Design, Implementation, and Performance," Technical Report DCR-TR-481, Computer Science Department, Rutgers University, 14 pages, Mar. 2002.
Jon Crowcroft, Derek McAuley; "ATM: A Retrospective on Systems Legacy," ACM Computer Communication Review, vol. 32, No. 5, pp. 11-21, Nov. 2002.
Charles Kalmanek; "A Retrospective View of ATM," ACM Computer Communication Review, vol. 32, No. 5, pp. 13-19, Nov. 2002.
Jonathan Smith; "The Influence of ATM on Operating Systems," ACM Computer Communication Review, vol. 32, No. 5, pp. 29-37, Nov. 2002.
NR Adiga, et al.; "An Overview of the BlueGene/L Supercomputer," Proceedings of the 2002 ACM/IEEE conference on Supercomputing, pp. 1-22, Baltimore; Nov. 16, 2002.
Steven J. Sistare, Christopher J. Jackson; "Ultra-High Performance Communication with MPI and the Sun Fire Link Interconnect," Proceedings of the 2002 ACM/IEEE conference on Supercomputing, p. 1-15, Baltimore; Nov. 16, 2002.
R. Bush, D. Meyer; "Some Internet Architectural Guidelines and Philosophy," IETF Network Working Group, Request for Comments: 3439, pp. 1-25, Dec. 2002.
Pasi Sarolahti, et al.; "F-RTO: An Enhanced Recovery Algorithm for TCP Retransmission Timeouts," ACM Computer Communication Review, vol. 33, No. 2, pp. 51-63, Apr. 2003.
Tom Kelly; "Scalable TCP: Improving Performance in Highspeed Wide Area Networks," ACM Computer Communication Review, vol. 33, No. 2, pp. 83-91, Apr. 2003.
Jeffrey C. Mogul; "TCP offload is a dumb idea whose time has come," Proceedings of HotOS IX: The 9th Workshop on Hot Topics in Operating Systems, pp. 26-30, May 18, 2003.
Derek McAuley, Rolf Neugebauer; "A case for Virtual Channel Processors," Proceedings of the ACM SIGCOMM 2003 Workshops, pp. 237-242, Aug. 2003.
Justin Hurwitz, Wu-chun Feng; "Initial End-to-End Performance Evaluation of 10-Gigabit Ethernet," Proceedings of the 11th Symposium on High Performance Interconnects, 6 pages, Aug. 20, 2003.
Vinay Aggarwal, et al.; "Workshop on network-I/O convergence: experience, lessons, implications (NICELI)," ACM Computer Communication Review, vol. 33, No. 5, pp. 75-80, Oct. 2003.
Wu-chun Feng, et al.; "Optimizing 10-Gigabit Ethernet for Networks of Workstations, Clusters, and Grids: A Case Study," Proceedings of the 2003 ACM/IEEE conference on Supercomputing, Phoenix, Arizona, 13 pages, Nov. 15, 2003.
Jiuxing Liu, et al.; "Performance Comparison of MPI Implementations over InfiniBand, Myrinet and Quadrics," Proceedings of the 2003 Acm/IEEE conference on Supercomputing, Phoenix, Arizona, pp. 1-15, Nov. 15, 2003.
Srihari Makineni and Ravi Iyer; "Architectural Characterization of TCP/IP Packet Processing on the Pentium M Processor," Proceedings of the 10th International Symposium on High Performance Computer Architecture, 11 pages, Feb. 14, 2004.
Cheng Jin, et al.; "Fast TCP: Motivation, Architecture, Algorithms, Performance," Proceedings of IEEE Infocom 2004, 21 pages, Mar. 7, 2004.
Andy Currid; "TCP Offload to the Rescue," ACM Queue, vol. 2, No. 3, pp. 58-65, May 1, 2004.
Greg Regnier, et al.; "TCP Onloading for Data Center Servers," Computer, IEEE Computer Society, vol. 37, No. 11, pp. 48-58, Nov. 2004.
Gregory L. Chesson; "Declaration of Dr Gregory L Chesson in Alacritech v. Microsoft," United States District Court, Northern District California, San Francisco Division, 289 pages, Feb. 4, 2005.
Edward D. Lazowska, David A. Patterson; "Computing Research: A Looming Crisis," ACM Computer Communication Review, vol. 35, No. 2, 2005, pp. 65-68, Jul. 2005.

(56) References Cited

OTHER PUBLICATIONS

W. Feng, et al.; "Performance Characterization of a 10-Gigabit Ethernet TOE," Proceedings of the 13th Symposium on High Performance Interconnects, pp. 1-6, Aug. 17, 2005.
B. Leslie, et al.; "User-level device drivers: Achieved performance," J. Comput. Sci. & Technol., vol. 20, pp. 1-17, Sep. 2005.
P. Balaji, et al.; "Head-to-TOE Evaluation of High-Performance Sockets Over Protocol Offload Engines," Proceedings of the IEEE International Conference on Cluster Computing, 2005, pp. 1-10, Sep. 2005.
Humaira Kamal, et al.; "SCTP versus TCP for MPI," Proceedings of the 2005 ACM/IEEE conference on Supercomputing, Seattle, Washington, 14 pages, Nov. 12, 2005.
Sumitha Bhandarkar, et al.; "LTCP: Improving the Performance of TCP in Highspeed Networks," ACM Computer Communication Review, vol. 36, No. 1, pp. 41-50, Jan. 2006.
H. K. Jerry Chu; "Zero-Copy TCP in Solaris," Proceedings of the USENIX Annual Technical Conference, 13 pages, Jan. 1996.
Ken Calvert; "Reflections on Network Architecture: an Active Networking Perspective," ACM Computer Communication Review, vol. 36, No. 2, pp. 27-30, Apr. 2006.
Jon Crowcroft; "10 Networking Papers: Recommended Reading," ACM Computer Communication Review, vol. 36, No. 2, pp. 31-32, Apr. 2006.
Greg Minshall, et al.; "Flow labelled IP over ATM: design and rationale," ACM Computer Communication Review, vol. 36, No. 3, pp. 79-92, Jul. 2006.
David Wetherall; "10 Networking Papers: Readings for Protocol Design," ACM Computer Communication Review, vol. 36, No. 3, pp. 77-78, Jul. 2006.
Patrick Geoffray; "A Critique of RDMA," HPCWire article: http://www.hpcwire.com/features/17886984.html, 7 pages, Aug. 18, 2006.
Petrini, F., "Protocol Off-Loading vs On-Loading in High-Performance Networks," Hot Interconnects 2006, 14th Symposium on High Performance Interconnects, Aug. 23, 2006, 4 pages.
Jose Carlos Sancho, et al.; "Quantifying the Potential Benefit of Overlapping Communication and Computation in Large-Scale Scientific Applications," Proceedings of the 2006 ACM/IEEE conference on Supercomputing, Tampa, Florida, 40 pages, Nov. 11, 2006.
Sayantan Sur, et al.; "High-Performance and Scalable MPI over InfiniBand with Reduced Memory Usage: An In-Depth Performance Analysis," Proceedings of the 2006 ACM/IEEE conference on Supercomputing, Tampa, Florida, 13 pages, Nov. 11, 2006.
Steven Pope, David Riddoch; "10Gb/s Ethernet Performance and Retrospective," ACM Computer Communication Review, vol. 37, No. 2, pp. 89-92, Mar. 19, 2007.
Kieran Mansley, et al.; "Getting 10 Gb/s from Xen," Euro-Par Conference 2007, Rennes, France, 10 pages, Aug. 28, 2007.
M. Kaiserswerth; "The Parallel Protocol Engine," IEEE/ACM Transactions in Networking vol. 1, Issue 6, pp. 650-663, Dec. 1993.
Danny Cohen, et al.; "Use of message-based multicomputer components to construct gigabit networks," ACM Computer Communication Review, vol. 23, No. 4, p. 32-44, Jul. 1993.
J. Evans and T. Buller; "The End of History," IEEE TCGN Gigabit Networking Workshop, 10 pages, Apr. 22, 2001.
M.V. Wilkes and R.M. Needham; "The Cambridge Model Distributed System," ACM SIGOPS Operating Systems Review, vol. 14, Issue 1, pp. 21-29, Jan. 1980.
Geoffray, P., "Protocol Off-Loading vs On-Loading in High-Perfomance Networks," Hot Interconnects 2006, 14th Symposium on High Performance Interconnects, Aug. 23, 2006, 5 pages.
Dickman, L., "Protocol OffLoading vs OnLoading in High Performance Networks," Hot Interconnects Panel, 14th Symposium on High Performance Interconnects, Aug. 23, 2006, 7 pages.
Reginer, G., "Protocol Onload vs. Offload," Hot Interconnects 2006, 14th Symposium on High Performance Interconnects, Aug. 23, 2006, 1 page.
Montry, G., "Open Fabrics Alliance," www.openfabrics.org, Hot Interconnects 2006, 14th Symposium on High Performance Interconnects, Aug. 23, 2006, 8 pages.
EP 13168400.3—European Search Report dated Jan. 20, 2014, 6 pages.
Ep 15183942.0—Extended European Search Report dated Jul. 10 2015, pp. 4.

* cited by examiner

FAST LINKUP ARBITRATION

CROSS REFERENCE TO OTHER APPLICATIONS

This application claims the benefit of prior U.S. Provisional Patent Application No. 61/667,539, filed 3 Jul. 2012, and U.S. Provisional Patent Application No. 61/677,365, filed 30 Jul. 2012, both of which applications are incorporated herein by reference in their entirety.

BACKGROUND

The invention relates to improved mechanisms for the communication of network messages between two network nodes on a physical connection being established between those nodes at a physical layer switch.

It is common practice for the release of news bulletins relating to certain events to be tightly controlled such that the bulletins are released not before a scheduled time. This is particularly well known in finance where there can be significant value in being the first to have access to information that could affect the markets. For example, news bulletins carrying the details of governmental budgets or interest rate changes by central banks are often embargoed until a predetermined time, at which point the news agencies that have been permitted to report on the event simultaneously release their bulletins into the public domain.

News bulletins are typically embargoed until a predetermined time by providing press reporters with access to the news information only within a "lock-up room" that is isolated from the outside world, with no communications being permitted from the room. Within the lock-up room, the news reporters are free to draft bulletins reporting the news event on computers provided for that purpose. However, those computers are physically isolated from public communication networks by an "air gap". Network messages carrying the news bulletins are therefore queued for delivery at the transmit queues of the computers until, at the predetermined time, a switch is thrown and a physical connection to the news distribution network is established. Such press lock-ups are used by the Australian and Canadian governments so as to provide for a scheduled release of Federal Budget information (see http: (slash)(slash)www2b.abc.net.au/guestbook-central/entry.asp?GuestbookID=389&EntryID=7 55777 and http:(slash)(slash)www.cbc.ca/news/background/budget2006/blog.html), as well as by the US Department of Labor.

On a connection being made from the computer to the news distribution network, the physical and logical links appropriate to the communication protocols in use at the computer must be established so as to permit the transmission of the queued messages onto the network. For example, when a computer in the lock-up room is reconnected to the outside world, the computer would typically establish a connection with a server located outside of the lock-up room and configured to provide a gateway onto the respective news provider's network. If the connection were an Ethernet connection, then a physical layer link must first be established between the computer and server, over which a logical data link can subsequently be established to the intended endpoint receiver of the messages from that computer. For 100BASE-T Ethernet, the time required to establish such a data link layer connection can be 100 ms or more.

The advent of high speed trading has meant that significant profits can be made by traders who are able to exploit microsecond advantages in the receipt of financial information. Delays of tens of milliseconds therefore represent a significant length of time. Furthermore, the physical switch by which the computers of a lock-up room are isolated from the public networks will not close all of its ports simultaneously. There is typically a random distribution in its port closure timings with millisecond order standard deviation such that the time between a given pair of ports closing can be significant. This inadvertently causes the news bulletins from the lock-up computers allocated to some news providers to be released prior to the bulletins of other providers.

There is therefore a need for an improved mechanism for the scheduled release of embargoed news bulletins, particularly those bulletins carrying financial news.

SUMMARY OF THE INVENTION

According to a first aspect of the present invention there is provided a data processing system comprising:

first and second network ports each operable to support a network connection configured according to one or more of a predetermined set of physical layer protocols; and a processor configured to, on a network message being formed for transmission to a network endpoint accessible over either of the first and second network ports:

estimate the total time required to, for each of the predetermined set of physical layer protocols, negotiate a respective network connection and transmit the network message over that respective network connection;

select the physical layer protocol having the lowest estimate of the total time required to negotiate a respective network connection and transmit the entire network message over that respective network connection; and configure at least one of the first and second network ports to use the selected physical layer protocol.

Suitably the processor is operable to, on a physical link being made to the first and second network ports a first time, cause the data processing system to signal over each of the at least one or the first and second network ports the identity of the selected physical layer protocol for use over those respective links on those physical links being made a subsequent time.

Preferably the processor is further configured to enqueue the network message at a transmit queue of each of the at least one of the first and second network ports such that, on a physical link being made to the respective network ports, the network message is transmitted from each of the at least one of the first and second network ports over a network connection established according to the selected physical layer protocol.

Preferably the transmit queue(s) are supported in hardware at network interface device(s) providing the respective at least one of the first and second network ports.

Preferably the data processing system further comprises a data store comprising data from which the processor is configured to estimate the total times. Preferably the data store comprises estimates of the time required to negotiate network connections over the first and second network ports according to each of the predetermined set of physical layer protocols. Preferably estimates of the time required to negotiate network connections over the first and second network ports represent estimates of the total time required to establish physical layer and data link layer connections. Preferably the data store comprises data representing the time required to transmit the network message as a function of network message size over network connections configured according to each of the predetermined set of physical layer protocols. Preferably the time required to transmit the network message over network connections configured according to each of the predetermined set of physical layer protocols comprises the total time required to transmit the entire network message over the respective network port.

Preferably the processor is configured to apply the selected physical layer protocol to both the first and second network ports and enqueue copies of the network message at a transmit queue corresponding to each of the first and second network ports such that, on physical links being made to the first and second network ports, the network message is transmitted in parallel over the physical links. Suitably the at least some of the physical layer protocols of the predetermined set of physical layer protocols are of the same type of physical layer protocol but defined so as to operate at different line speeds.

Suitably the at least some of the physical layer protocols of the predetermined set of physical layer protocols are of the same type of physical layer protocol but defined so as to operate with different compression schemes, and the estimate of the time required to, for each of the predetermined set of physical layer protocols, transmit the entire network message over that respective network connection includes the time required to decompress the network message were it compressed in accordance the compression scheme of the respective physical layer protocol. The compression schemes could include deflate, LZW, and no compression. Preferably the data store further comprises data from which the processor is configured to calculate the time required to decompress the network message in accordance with each of the compression schemes of the predetermined set of physical layer protocols.

Preferably the processor is configured to perform the selection of the physical layer protocol independently of the type of physical interfaces of the one or more physical links, the processor being operable to select any of the set of physical layer protocols for use over any of the plurality of physical links.

Suitably the selected physical layer protocol for a given network port is any of 100BASE-TX, 10 GBASE-T and Serial RS-485, and the physical interface of that network port is Ethernet RJ45.

Preferably the processor is supported at a network interface device of the data processing system, the processor optionally being implemented within an FPGA.

According to a second aspect of the present invention there is provided a system for communicating network messages between a pair of network nodes separated by a physical layer switch, the system comprising:
 a first network node having a first plurality of network ports connected to a physical layer switch; and
 a second network node having a second plurality of network ports connected to the physical layer switch and separated from the first network node by the physical layer switch;
wherein each of the first and second pluralities of network ports are operable to support a network connection configured according to one or more of a predetermined set of physical layer protocols and each of the first plurality of physical ports is arranged to correspond to one of the second plurality of physical ports such that, in a first mode, the physical layer switch is operable to simultaneously provide a physical link between each of the first plurality of physical ports and its corresponding one of the second plurality of physical ports and, in a second mode, the physical layer switch is operable to simultaneously isolate each of the first plurality of physical ports from its corresponding one of the second plurality of physical ports;
the first network node being configured to, on forming a network message for transmission to a network endpoint accessible over the plurality of physical links:
 estimate the total time required to, for each of the predetermined set of physical layer protocols, negotiate a respective network connection and transmit the entire network message over that respective network connection;
 select the physical layer protocol having the lowest estimate of the total time required to negotiate a respective network connection and transmit the entire network message over that respective network connection; and
 cause the network message to, on the physical layer switch entering its first mode, be transmitted over one or more physical links configured in accordance with the selected physical layer protocol.

Preferably the first network node is configured to select the one or more physical links by:
 selecting one physical link at random;
 selecting all those physical links capable of supporting a network connection configured in accordance with the select physical layer protocol; or
 selecting those physical links that offer the lowest estimate of the total time required to, for the selected physical layer protocol, negotiate a respective network connection and transmit the entire network message over that respective network connection.

Preferably the first network node is operable to, on the physical layer switch entering its first mode a first time, signal over the one or more physical links to the second network node the identity of the selected physical layer protocol, the first and second network nodes being configured to use the selected physical layer protocol over the one or more physical links on the physical layer switch entering its first mode made a subsequent time.

Preferably the first network node is further configured to enqueue the network message at a transmit queue of each of the one or more physical links such that, on the physical layer switch entering its first mode, the network message is transmitted over the one or more physical links in accordance with the selected physical layer protocol.

Preferably each of the transmit queue(s) is supported in hardware at a network interface device, each transmit queue being at that network interface device providing the network port corresponding to the respective one of the one or more physical links.

Preferably the first network node is configured to apply the selected physical layer protocol to two or more physical links and to enqueue copies of the network message at transmit queues corresponding to each of the two or more physical links such that, on the physical layer switch entering its first mode, the network message is transmitted in parallel over the physical links.

Preferably the second network node is configured to, on receiving copies of the network message over the two or more physical links, keep only that network message received first at the second network node and to discard all those copies of the network message that are subsequently received.

Preferably the first network node is configured to include a sequence number with each network message it transmits such that duplicate network messages all sharing the same sequence number, and the second network node is configured to use the sequence number to identify duplicate network messages that are to be discarded.

Suitably the at least some of the physical layer protocols of the predetermined set of physical layer protocols are of the same type of physical layer protocol but defined so as to operate at different line speeds.

Suitably the at least some of the physical layer protocols of the predetermined set of physical layer protocols are of the same type of physical layer protocol but defined so as to operate with different compression schemes, and the estimate of the time required to, for each of the predetermined set of physical layer protocols, transmit the entire network message over that respective network connection includes the time required to decompress the network message were it compressed in accordance the compression scheme of the respective physical layer protocol. The compression schemes could include deflate, LZW, and no compression.

Preferably the selection of the physical layer protocol by the first network node is performed independently of the type of physical interfaces of the one or more physical links, the first network node is operable to select any of the set of physical layer protocols for use over any of the plurality of physical links.

Preferably the selected physical layer protocol for a given physical link is any of 100BASE-TX, 10 GBASE-T and Serial RS-485, and the physical interfaces of that physical link are Ethernet RJ45.

Preferably the second network node further provides a link to a data network over which the destination network endpoint of the network message is accessible, the data network supporting communications according to a predetermined set of communication protocols, and the second network node is configured to convert the network message into data packets formed in accordance with the predetermined set of communication protocols.

Preferably the second network node is configured to store information representing headers for the data packets formed in accordance with the predetermined set of communication protocols such that the second network node is operable to convert the network message into data packets without requiring substantial generation of the headers of the data packets in accordance with the predetermined set of communication protocols.

Preferably the first or second network node is configured to form a first timestamp on the physical layer switch entering its first mode and the second network node is configured to form a second timestamp on the network message being received at the second network node, the first or second network node being configured to estimate from the time elapsed between the first and second timestamps the latency in the transmission of the network message. Preferably the data processing system further comprises a data store comprising data from which the first network node is configured to estimate the total times. Preferably the first network node is further operable to update data stored at its data store in response to the estimate of the latency in the transmission of the network message.

Preferably the first and second network nodes are configured to, on the physical layer switch entering its first mode so as to permit transmission of the network message over the one or more physical links, establish according to the selected physical layer protocol a physical layer connection over at least some of the one or more physical links without substantial re-negotiation of the link parameters of those physical links by using, for each of the at least some of the one or more physical links, a set of stored link parameters defining a previously successful physical layer connection over the respective physical link.

According to a third aspect of the present invention there is provided a system for communicating network messages between a pair of network nodes separated by a physical layer switch, the system comprising:

a first network node having a first plurality of network ports connected to a physical layer switch; and a second network node having a second plurality of network ports connected to the physical layer switch and separated from the first network node by the physical layer switch;

wherein each of the first and second pluralities of network ports are operable to support a network connection configured according to one or more of a predetermined set of physical layer protocols and each of the first plurality of physical ports is arranged to correspond to one of the second plurality of physical ports such that, in a first mode, the physical layer switch is operable to simultaneously provide a physical link between each of the first plurality of physical ports and its corresponding one of the second plurality of physical ports and, in a second mode, the physical layer switch is operable to simultaneously isolate each of the first plurality of physical ports from its corresponding one of the second plurality of physical ports;

the first network node being configured to, on the physical layer switch entering the first mode, transmit duplicate network messages over two or more of the physical links in accordance with a selected one of the predetermined set of physical layer protocols, and the second network node being configured to, on receiving said duplicate network messages, discard all those duplicate network messages except the first received network message.

Preferably the first network node is configured to include a sequence number with each network message it transmits such that duplicate network messages all sharing the same sequence number, and the second network node is configured to use the sequence number to identify duplicate network messages that are to be discarded.

According to a fourth aspect of the present invention there is provided a system for communicating network messages between a pair of network nodes separated by a physical layer switch, the system comprising:

a first network node; and a second network node separated from the first network node by a physical layer switch;

wherein the physical layer switch is operable to switch between first and second modes: in the first mode the physical layer switch providing a physical connection between the first and second network nodes, and in the second mode the physical layer switch isolating the first network node from the second network node;

the first and second network nodes being configured to, on the physical layer switch entering the first mode for a first time:

establish one or more physical layer links between the first and second network nodes, the parameters of each link being negotiated between the first and second network nodes; and store said parameters of each of the one or more physical layer links;

the first and second network nodes being configured to, on the physical layer switch subsequently entering the first mode from the second mode:

read the stored parameters; and re-establish the one or more physical layer links between the first and second network nodes using the stored parameters without substantial re-negotiation of the link parameters.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to improved mechanisms by which network messages can be communicated between two network nodes when a physical connection is made between those nodes at a physical layer switch. The present invention is described below by way of example with reference to the scheduled transmission of network messages from an isolated data processing system to a data processing system having access to a data network. However, the present invention finds general application to the communication of data between two network nodes separated by a physical layer switch. There could be additional network nodes such as other data processing systems, routers and switches between the network nodes in addition to the physical layer switch.

Figure 1:
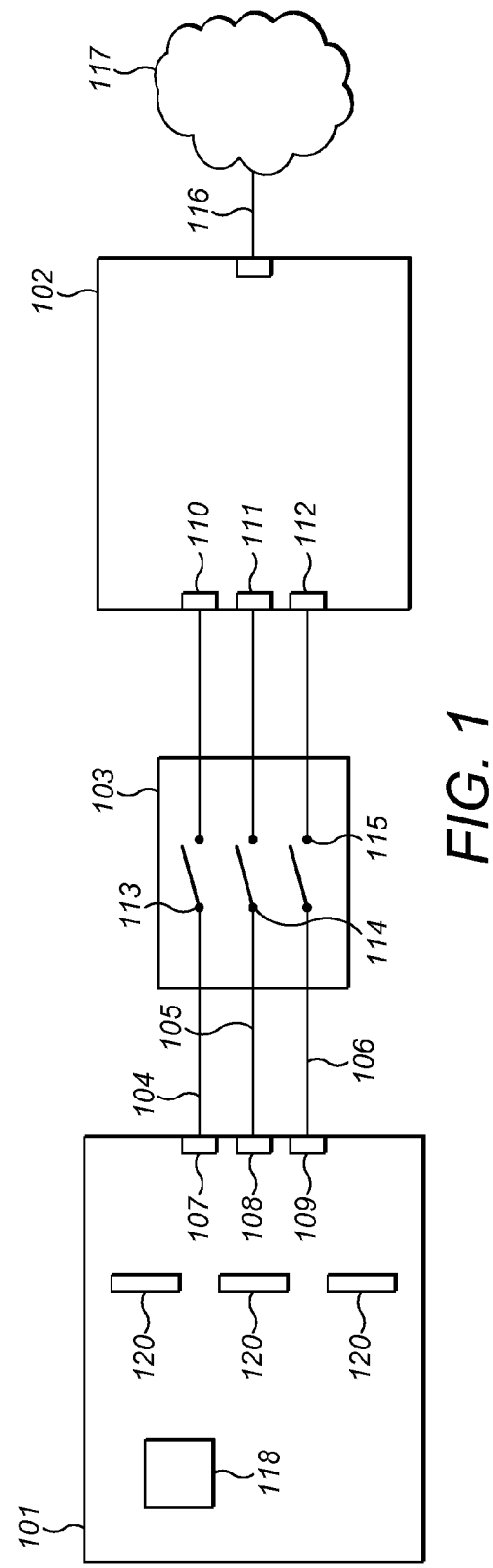
FIG. 1 is a schematic drawing of a system configured in accordance with the present invention.

A schematic diagram of a system configured in accordance with the present invention is shown in FIG. 1. The system comprises a pair of network nodes 101, 102 connected to one another by means of a physical layer switch 103. One or more physical links 104, 105, 106 extend between physical ports 107, 108, 109 of network node 101 and corresponding physical ports 110, 111, 112 of network node 102. Switches 113, 114, 115 of the physical layer switch 103 are operable to physically connect and disconnect respective physical links, as shown in the figure. When one of the switches is closed, an electrical connection is made between the corresponding ports of network nodes 101 and 102 so as to allow physical and logical layer connections to be established over the respective links. Preferably the physical layer switch is operable to open and close all of switches 113, 114 and 115 at least approximately simultaneously.

Network node 101 cannot transmit network messages to network node 102 when the switches of physical switch 103 are open. Node 101 therefore comprises transmit queues 120 at which its network messages can be enqueued until switch 103 connects links 104-106 between the nodes.

In many scenarios in which a pair of network nodes are separated by a physical switch, it is important for the network messages enqueued at node 101 to be transmitted over the links to node 102 with the lowest possible latency when that switch 103 reconnects the physical links. For example, network node 101 could be a data processing system within a press lock-up at which sensitive financial news is being prepared, with network messages representing news bulletins being enqueued at queues 120 during the lock-up. Node 101 could be configured to receive network messages from multiple press computers over a local air-gap network but typically node 101 would be just one of several press computers connected into switch 103 For instance, switch 103 could have 48 ports with each of eight news providers being assigned 6 ports at random; if each network node 101 of a given news provider supported three connections to the switch then that network provider could operate two pairs of nodes 101 and 102 (each node 101 could connect to the same node 102 or a different node 102, depending on the number of connections supported by node 102).

Once the scheduled time is reached and the news bulletins are to be released into the public domain, switch 103 would be closed and the enqueued network messages press computer 101 would begin to flow to network node 102, which supports a permanent link 116 to news distribution network 117. Typically network nodes 101 and 102 would both be operated by the same news provider, with node 101 being a press computer at which one or more journalists of the news provider draft press releases and node 102 being a server providing a dedicated connection to that news provider's data network.

In a first embodiment of the present invention, links 104, 105 and 106 support (when connected) a network connection configured in accordance with one of a predetermined set of physical layer protocols. Each physical layer protocol of the set could differ in the type of protocol (e.g. 100BASE-TX or Serial RS-485) and/or its line speed (e.g. a 100BASE-TX physical layer could be operated at 100 Mb/s or 10 Mb/s) and/or the compression scheme in use.

When switches 113, 114 and 115 are closed so as to complete physical links 104, 105 and 106 between the network nodes, negotiation of the parameters of the physical layer of each link begins according to the physical layer protocols in use over that link. For example, links 104, 105 and 106 could be RS-485 serial, 100BASE-TX and a 10 GBASE link (such as 10 GBASE-CR or 10 GBASE-T), respectively. Each physical layer connection would be established according to the protocol in use of the respective link and, subsequently, any required logical links would be negotiated between endpoints served over that connection prior to network messages being transmitted between the first and second nodes.

Note that it is preferable that any physical layer protocol could be selected for any physical link with which it is electrically compatible. For example, 100BASE-TX 10 GBASE-T and RS-485 may use twisted pair cabling and it is therefore straightforward to run any of these protocols over a twisted pair cable, irrespective of the default designation of each physical link and the type of interfaces provided at the respective network ports of the network interface device and switch (e.g. any of 100BASE-TX, 10 GBASE-T and RS-485 physical layer protocols could be configured to operate over twisted pair cabling terminated by Ethernet RJ45 connectors).

Figure 3:
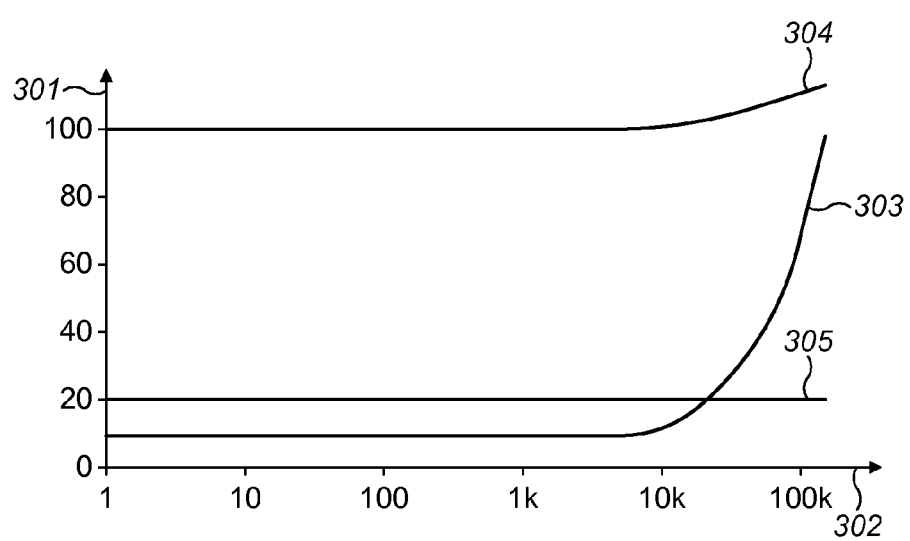
FIG. 3 is a graph illustrative of the variation of latency with message size for various types of physical link.

The time required to establish physical and logical layer connections and then to transmit a network message over that link depends on several factors, including the particular protocol in use, the line speed at which that protocol is to operate, and the size of the network message to be transmitted. The time taken to establish physical and logical connections and to transmit a network message over a link for the three exemplary protocols 10 Mb RS-485 serial, 100BASE-TX and 10 GBASE-CR (all operating at their maximum line speeds) is shown in FIG. 3 as a function of network message size. It can be seen from the figure that 10 GBASE-CR exhibits consistently lower connection latency than 100BASE-TX, but that for small message sizes of less than around 100 kB, 10 Mb RS-485 serial offers lower latency. This is because the lower overhead required to establish an RS-485 link dominates at small message sizes. At larger message sizes, the greater bandwidth of 100BASE-TX and 10 GBASE-CR becomes significant.

In accordance with the first embodiment of the present invention, network node 101 is configured to, for each network message, select between the different physical layer protocols available for transmitting the message to node 102. This selection is performed in dependence on the size of the network message and the time required to negotiate a connection according to each physical layer protocol so as to minimise the latency associated with transmitting the message when the links are connected by switch 103. For example, with reference to FIG. 3, it is optimal to transmit messages that are less than 100 kB in size over serial link 104, and messages over 100 kB in size over 10 GBASE-CR link 106.

Network node 101 comprises a processor 118 configured to perform the selection of the physical layer protocol and cause one or more of the physical links 104-106 to be configured in accordance with that selected protocol. Processor 118 could be any suitable processor, including a general purpose processor (e.g. a CPU) of network node 101 arranged to execute suitable software, a processor dedicated to supporting network functionalities of the network node, or a combination of software supported at a general purpose processor with a dedicated processor. Preferably processor 118 is at least partly supported at a hardware processor of a network interface device of the network node.

Some physical links may be constrained in terms of the physical layer protocols they can supported. In this case it can be advantageous to allocate network messages to those links even if they offer higher latency when the transmission of that network packet is considered in isolation. For example, if link 105 is constrained to support only 100BASE-TX, that link could be used for a network message once the transmit queues 120 at node 101 corresponding to links 104 and 106 (which have been selected to support lower latency protocols) have filled to the extent that the network message would arrive at node 102 sooner once switch 103 is closed than if the network message were queued for transmission over links 104 and 106 that on the face of it provide lower latency when that network message is considered in isolation. This could be applied as a secondary criterion when network node 101 performs the selection between available links 104-106 but would not normally be required in the case that network node 101 is located within a press lockup because typically only one or two messages are enqueued during lockup periods. In the event that the network node has multiple messages to transmit, the node is preferably configured to allocate short messages to lower latency links and long messages to high bandwidth links. For example, if the network node has multiple short messages and one long message to transmit, the node would allocate the long message to a 100BASE-TX link and the short messages to a lower latency link.

Switch 103 is configured to, when the two nodes are to be reconnected, simultaneously connect the physical links between the nodes. This allows the nodes to negotiate and establish the necessary physical and logical connections over each of the links and transmit the network messages in parallel over their selected links. Since each network message has been assigned to a link configured to use the physical layer protocol that will allow that message to be delivered at the optimum latency, this has the effect that the network messages at node 101 are efficiently conveyed to node 102. Only three links are shown in FIG. 1, but typically physical switch 103 would support many more. For example, switch 103 could be operable to switch up to 100 links extending between pairs of nodes such as node pair 101 and 102.

In order to allow onward transmission of the network messages, it may be necessary to configure node 102 to convert the network messages from one protocol to another. For example, node 102 would typically have a permanent Ethernet link 116 to network 117 (e.g. the news distribution network) and network messages received at node 102 according to the RS-485 serial protocol would therefore need to be re-framed according to the relevant Ethernet protocol before onward transmission onto network 117. It is preferable that network messages sent between nodes 101 and 102 are not encapsulated for onward transmission according to the protocols in use over link 116, with the formation of the data packets being performed at node 102 by converting the network messages received in accordance with the selected protocols to data packets carrying the network messages in a form suitable for transmission over link 116. Such conversion could be performed in hardware at a suitably programmed network interface device or other processor at node 102. In embodiments of the present invention, selection between the available physical layer protocols could be further performed in dependence on the time overhead associated with performing protocol conversion at node 102. Thus, for a given message size, the time required to perform protocol conversion would be added to the time required to establish a connection and transmit a network message to node 102.

In order to mitigate the time overhead associated with performing protocol conversion, it can be advantageous to arrange that node 102 store information representing headers for data packets in accordance with the communication protocols in use over link 116. For example, if network messages are transmitted onwards over link 116 according to Ethernet/IP/UDP then information representing suitable UDP headers could be stored at node 102 ready for the moment when switch 103 connects nodes 101 and 102 together. In the example in which node 101 is a computer in a press lockup and node 102 is operated by the owner of that press computer this can be readily arranged since the destination address of the network messages can be known to node 102. Certain fields of the headers, such as checksums, can be calculated on receiving the network message payload, as is known in the art.

It is advantageous if additionally or alternatively, node 101 is configured to select from a predetermined set of data compression schemes available for a given link (e.g. a deflate or LZW algorithm). Compressing a network message would typically reduce its size and hence could allow that message to be transmitted at a lower latency than would otherwise be possible once the switch connects the physical link (i.e. because there is less data to transmit and it therefore takes less time and/or because smaller messages can be selected to be sent over a connection that can be more established at a lower latency, as described above). However, the time taken to decompress each network message at node 102 must be taken into account if the net latency experienced by a given message is to be reduced. The time taken to compress a network message is not relevant since the physical link is not connected when the messages are enqueued.

Node 101 is therefore preferably configured to select a compression scheme (or no compression at all) in dependence on the estimated time it would take node 102 to decompress the network message. The compression scheme that is likely to allow a message to be transmitted with the lowest latency would be selected; if no compression scheme improved on the transmission latency estimated for a network message then the message would not be compressed. Most preferably, node 101 is additionally configured to perform the physical layer protocol selection of the first embodiment of the present invention so as to transmit a given network message with that selection of compression scheme and physical link that minimises the latency associated with the transmission of that message. In other words, the node 101 would be configured to select the optimum combination of physical layer protocol and compression scheme in dependence on a function of message size and decompression time.

Preferably node 101 stores data representing the time required to decompress network messages of varying sizes according to the available compression schemes. This data could be, for example, in the form of empirical data, algorithms or mathematical equations.

When the nodes are connected by switch 103, node 101 could be configured to identify the compression schemes supported by each of the links to node 102. This identification could be performed during negotiation of the connections over a link or by means of any other suitable mechanism. The data compression schemes available for a link could be determined by the communication protocols in use over that link when the link is connected. Since links 104-106 are private links with node 102 being operable to bridge the links to the wider network 117, the protocols and/or compression schemes used over the links need not adhere to the conventional set of protocols and/or compression schemes that are normally defined or used over such physical links. The protocols and/or compression schemes in use over the links could be proprietary.

The present invention recognises that because network messages are enqueued at the transmitting node for later (optionally scheduled) transmission, it is acceptable to perform some processing at the transmitting node so as to minimise the latency associated with transmitting network messages to the receiving node when the physical link is connected. Thus, node 101 has time to determine the best mode of transmission for each data packet. Preferably, prior to switch 103 closing and connecting the nodes together so as to allow the transmission of network messages to occur, node 101 is configured to signal to node 102 the physical layer protocol selected for each link. This can be achieved by having the switch briefly connect one or more physical links for the purpose of transmitting the selected physical layer protocol information to node 102. This allows node 101 to establish connections according to the selected protocols as soon as switch 103 closes, and without having to first wait for information identifying the selected protocols to be transmitted to node 102. Alternatively, node 101 could be configured to send a short identifier (e.g. a predetermined signal or symbol) over each link when switch 103 closes so as to identify the selected physical layer protocol for each link to node 102.

It is further advantageous if, nodes 102 and 101 are configured to perform timestamping over links 104-106 so as to identify the latency associated with transmitting network messages of varying sizes between the nodes. For example, node 101 and/or 102 could be configured to form a connect timestamp when switch 103 establishes a physical link between nodes 101 and 102, and node 102 would be configured to subsequently form a receive timestamp indicating when each network message is received at node 102. This mechanism allows one or both nodes to determine the latency associated with successfully transmitting a network message of known size from node 101 to node 102 over a given link according to a given physical layer protocol. The receive timestamps could be transmitted from node 102 to node 101 so as to inform node 101 of the latency experienced by each message (this information is not latency sensitive and could be performed over any suitable link so as to not delay the communication of network messages between the nodes).

In the case that node 101 is configured to select between a set of compression schemes, the receive timestamp could indicate when each network message has been successfully decompressed at node 102 so as to allow node 101 to receive empirical information describing the latency experienced by the messages it has transmitted.

Node 101 could support a data store storing estimated latency values for each physical layer protocol of a predetermined set for a range of network messages sizes and optionally data compression schemes. The latency values could include, for each physical layer protocol (and optionally on a per-port basis), the time taken to establish a data connection over a link according to that protocol. The data store could also store data expressing the latency associated with message transmission—e.g. for a given line speed and protocol, the time required to transmit a network message of a given size onto the wire. The timestamp information could be used to update the latency values at the data store, and hence can be used to inform the physical layer protocol selection (and optionally compression scheme) for each message by node 101. Alternatively or additionally, the data store could hold algorithms or mathematical equations representing estimated variation of latency values with network message size (and optionally compression scheme) for each physical layer protocol. Node 101 could be configured to form absolute values of the estimated latency for a message, or relative values expressing the relative latencies of the physical layer protocols for a given message.

It can be advantageous to arrange that switch 103 connect nodes 101 and 102 for the purposes of calibrating the latency values held at the data store. For example, in the case that node 101 is located in a press lock-up, switch 103 could connect nodes 101 and 102 prior to the establishment of the lock-up in order for test messages of varying sizes to be transmitted over the links 104-106 and the respective calibrated latency values to be stored at the data store. Nodes 101 and 102 could be configured to continuously update the latency values in dependence on the timestamping performed at node 102 and/or node 101.

Figure 2:
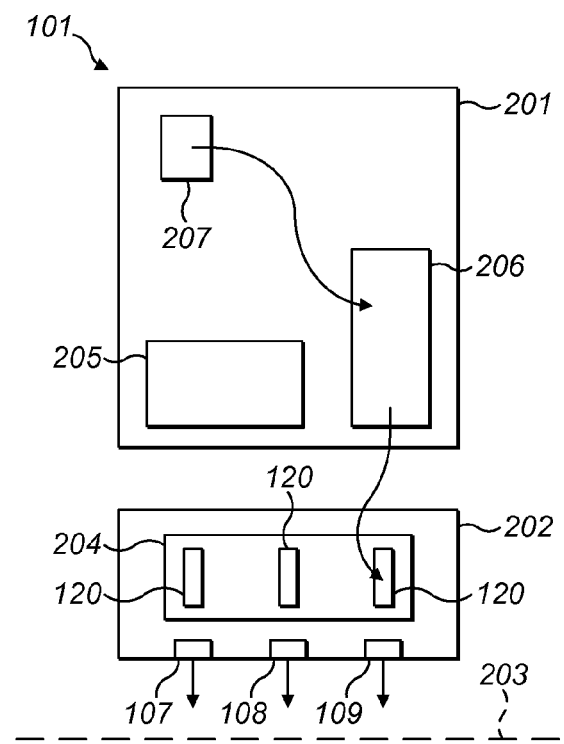
FIG. 2 is a schematic drawing of a network node configured in accordance with the present invention.

Preferably node 101 is configured to enqueue the network messages in hardware, with transmit queues 120 being provided at a hardware device such as a network interface device. Such a node 101 configured in accordance with the present invention is shown in FIG. 2. The node comprises a data processing system 201 and a network interface device 202. The data processing system supports an operating system kernel 205 and at least one application 207. The network interface device supports a plurality of network ports 107, 108 and 109, and the transmit queues 120. Three transmit queues are shown, one for each network port, but there could be any number of queues in any suitable configuration. Typically the queues would be supported at a memory 204, which could be part of, or coupled to, an FPGA processor which could be supported at a NIC or other peripheral device. Providing the queues in hardware avoids the need for the generation of an interrupt to cause the operating system to release network messages enqueued at software queues. This also enables the messages to be released in parallel—for example, without crossing a bus shared between network cards each supporting one or more of ports 107-109, or other devices connected to the bus.

Optionally, data processing system 201 supports a user-level network stack 206 configured to provide a low-latency data path to the network interface device that avoids kernel 205 (as indicated by the arrows in the figure). In alternative embodiments, transmit queues 120 could be software queues supported on the low latency data path—this at least provides a lower latency transmit path (compared to a conventional kernel-mediated transmit path) once the switch connects node 101 across air gap 203 to the network.

Preferably nodes 101 and 102 have a number of ports operable to support between them multiple parallel links configured according to the same physical layer protocols. It is in this case advantageous if node 101 is configured to duplicate each network message to be transmitted over a link of a given type and transmit a copy of the network message over two or more links of that type supporting the same physical layer protocol. This can be achieved by enqueueing network messages at transmit queues corresponding to multiple links. It is most preferable if the messages are queued in hardware, as described above. Duplicating messages over multiple links builds in redundancy so as to avoid lost packets causing significant delays to the time required to successfully transmit a network message between the nodes (e.g. while retransmission of the packet(s) occurs).

Furthermore, for scenarios in which there are multiple pairs of nodes 101 and 102 connected across switch 103 (such as the case in which node 101 is one of several press computers held in a lock-up), the variation in the time taken for a connection to be established over physical links of the same type becomes the dominant contribution to the variation in the time taken for each originating node (e.g. node 101) to transmit its message(s). The variation in the time taken for a connection to be established over a physical link arises because the time required to negotiate the necessary physical and logical layer connections over a link of a given type when switch 103 closes displays inherent random variation. For commonly deployed physical layer switches, this variation is of the order of 1 ms. By arranging that a network node enqueue a network message for simultaneous transmission over all of the links of the selected type, this variation can be minimised because each message has the opportunity to travel over the link that first establishes the connection for that node.

It is generally not preferable to allow duplicate messages to be transmitted onwards from node 102. Preferably node 102 is therefore configured to remove duplicate messages that arrive after the first network message. In this manner, only the first network message to arrive is retained and transmitted onwards onto network 117. Preferably the removal of duplicate messages is performed in hardware (e.g. at a network interface device of node 102) so as to minimise the latency introduced by the processing overhead associated with the removal of duplicate messages.

It can be advantageous to duplicate messages over links of different types (for example, an RS-485 serial link and a 10 GBASE-CR Ethernet link) in order to reduce the possibility of a network message being dropped. In other words, the redundancy benefits can be achieved even if the network messages are sent over different types of link. In this case, node 101 would be configured to transmit information to node 102 sufficient to allow node 102 to identify each set of duplicate messages sent over links of different types. Preferably, node 101 would be configured to encapsulate each network message with a sequence number such that when that encapsulated network message is sent over multiple links, each of the duplicated messages share that same sequence number. This allows node 102 to filter out duplicate messages without being required to reassemble each network message in order to determine whether that message has already been received. Node 102 would preferably be configured to remove the encapsulation prior to transmitting onto network 117 the first-received of each network message.

In embodiments of the present invention, all of the physical links 104-106 between the nodes 101 and 102 could be arranged to support the same physical layer protocol, with each network message being sent over two or more such links. Such embodiments would provide the advantages discussed above without the requirement for the nodes to support links of different types. Node 102 would preferably be configured to remove duplicate messages that arrive after the first network message.

In all embodiments of the present invention it is advantageous if the transmitting and receiving nodes 101 and 102 are configured to store state of a physical layer connection so as to allow that connection to be re-established when the underlying physical link is connected by the switch without requiring initial re-negotiation of the link. If the connection cannot be reestablished the link can fall back to performing a conventional negotiation of physical parameters for the connection. For example, in the case of an Ethernet link there is an established initial negotiation of the parameters of a link to adapt the link to the physical characteristics of the communication channel (e.g. length, cable quality, bending, ambient noise). With Ethernet the negotiating nodes may also exchange parameters that should be used to assist signal processing; e.g. 10 GBASE-T contains an encoding at the transmitter which requires that the receiver understand the encoding coefficients. By arranging that nodes 101 and 102 store those parameters the nodes can be enabled to more rapidly reinstate a connection when the physical link is reconnected by switch 103 because the initial negotiation of the physical parameters of the physical layer connection is not required and can be omitted.

When the physical link is re-connected, the nodes can attempt to re-establish the physical layer connection (assuming it remains of the same protocol) by using the set of stored parameters describing the state of the connection. Some signaling would generally be necessary in order to re-establish a connection but there would be no need to negotiate the line speed or other physical layer protocol options. This mechanism can be further used to omit the negotiation of link speed during establishment of a physical layer connection for protocols that support multiple link speeds. Since it can be known in advance the link speed that can be supported over links 104-106 for the various physical layer protocols, the nodes 101 and 102 can be configured to omit the negotiation of link speed during re-establishment of a connection and instead bring up the link at a pre-determined line speed.

A network interface device as described herein could be any suitable device, such as a peripheral card or a LAN-on-motherboard (LOM) device. The ports of each node would typically be provided at a network interface device. For example, a NIC might provide a set of conventional 10 GBASE-CR ports and be coupled to a daughterboard supporting an FPGA configured to provide a set of RS-485 serial ports.

The network nodes described herein could be any kind of data processing system, such as a server, personal computer, or a logical switch (e.g. a layer 2 switch).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A first network node comprising:
    first and second network ports each operable to support a network connection configured according to one or more of a predetermined set of physical layer protocols, said first and second network ports physically connected to corresponding network ports of a second network node by respective physical links; and
    a processor configured to, on a network message being formed for transmission to a network endpoint accessible over either of the first and second network ports:
        estimate the total time required to, for each of the predetermined set of physical layer protocols, negotiate a respective network connection and transmit the network message over that respective network connection;
        select the physical layer protocol having the lowest estimate of the total time required to negotiate a respective network connection and transmit the entire network message over that respective network connection; and
        configure at least one of the first and second network ports to use the selected physical layer protocol;
        wherein at least some of the physical layer protocols of the predetermined set of physical layer protocols are of the same type of physical layer protocol but defined so as to operate with different compression schemes, and the estimate of the time required to, for each of the predetermined set of physical layer protocols, transmit the entire network message over that respective network connection includes the time required to decompress the network message were it compressed in accordance with the compression scheme of the respective physical layer protocol.

2. A first network node as claimed in claim 1, wherein the processor is operable to, on a physical link being made to the first and second network ports a first time, cause the first network node to signal over each of the at least one or the first and second network ports the identity of the selected physical layer protocol for use over those respective links on those physical links being made a subsequent time.

3. A first network node as claimed in claim 1, wherein the processor is further configured to enqueue the network message at a transmit queue of each of the at least one of the first and second network ports such that, on a physical link being made to the respective network ports, the network message is transmitted from each of the at least one of the first and second network ports over a network connection established according to the selected physical layer protocol.

4. A first network node as claimed claim 1, wherein the transmit queue(s) are supported in hardware at network interface device(s) providing the respective at least one of the first and second network ports.

5. A first network node as claimed in claim 1, further comprising a data store comprising data from which the processor is configured to estimate the total times.

6. A first network node as claimed in claim 5, wherein the data store comprises estimates of the time required to negotiate network connections over the first and second network ports according to each of the predetermined set of physical layer protocols.

7. A first network node as claimed in claim 6, wherein estimates of the time required to negotiate network connections over the first and second network ports represent estimates of the total time required to establish physical layer and data link layer connections.

8. A first network node as claimed in claim 5, wherein the data store comprises data representing the time required to transmit the network message as a function of network message size over network connections configured according to each of the predetermined set of physical layer protocols.

9. A first network node as claimed in claim 8, wherein the time required to transmit the network message over network connections configured according to each of the predetermined set of physical layer protocols comprises the total time required to transmit the entire network message over the respective network port.

10. A first network node as claimed in claim 1, wherein the processor is configured to apply the selected physical layer protocol to both the first and second network ports and enqueue copies of the network message at a transmit queue corresponding to each of the first and second network ports such that, on physical links being made to the first and second network ports, the network message is transmitted in parallel over the physical links.

11. A first network node as claimed in claim 1, wherein the at least some of the physical layer protocols of the predetermined set of physical layer protocols are of the same type of physical layer protocol but defined so as to operate at different line speeds.

12. A first network node as claimed in claim 1, wherein the compression schemes include deflate, LZW, and no compression.

13. A first network node as claimed in claim 1, wherein the data store further comprises data from which the processor is configured to calculate the time required to decompress the network message in accordance with each of the compression schemes of the predetermined set of physical layer protocols.

14. A first network node as claimed in claim 1, wherein the processor is configured to perform the selection of the physical layer protocol independently of the type of physical interfaces of the one or more physical links, the processor being operable to select any of the set of physical layer protocols for use over any of the plurality of physical links.

15. A first network node as claimed in claim 14, wherein the selected physical layer protocol for a given network port is any of 100BASE-TX, 10GBASE-T and Serial RS-485, and the physical interface of that network port is Ethernet RJ45.

16. A first network node as claimed in claim 1, wherein the processor is supported at a network interface device of the first network node, the processor optionally being implemented within an FPGA.

17. A system for communicating network messages between a pair of network nodes separated by a physical layer switch, the system comprising:
    a first network node having a first plurality of network ports connected to a physical layer switch; and
    a second network node having a second plurality of network ports connected to the physical layer switch and separated from the first network node by the physical layer switch;
    wherein each of the first and second pluralities of network ports are operable to support a network connection configured according to one or more of a predetermined set of physical layer protocols and each of the first plurality of physical ports is arranged to correspond to one of the second plurality of physical ports such that, in a first mode, the physical layer switch is operable to simultaneously provide a physical link between each of the first plurality of physical ports and its corresponding one of the second plurality of physical ports and, in a second mode, the physical layer switch is operable to simultaneously isolate each of the first plurality of physical ports from its corresponding one of the second plurality of physical ports;

the first network node being configured to, on forming a network message for transmission to a network endpoint accessible over the plurality of physical links:

estimate the total time required to, for each of the predetermined set of physical layer protocols, negotiate a respective network connection and transmit the entire network message over that respective network connection;

select the physical layer protocol having the lowest estimate of the total time required to negotiate a respective network connection and transmit the entire network message over that respective network connection; and cause the network message to, on the physical layer switch entering its first mode, be transmitted over one or more physical links configured in accordance with the selected physical layer protocol.

18. A system as claimed in claim 17, wherein the first network node is configured to select the one or more physical links by:

selecting one physical link at random;

selecting all those physical links capable of supporting a network connection configured in accordance with the select physical layer protocol; or selecting those physical links that offer the lowest estimate of the total time required to, for the selected physical layer protocol, negotiate a respective network connection and transmit the entire network message over that respective network connection.

19. A system as claimed in claim 17, wherein the first network node is operable to, on the physical layer switch entering its first mode a first time, signal over the one or more physical links to the second network node the identity of the selected physical layer protocol, the first and second network nodes being configured to use the selected physical layer protocol over the one or more physical links on the physical layer switch entering its first mode made a subsequent time.

20. A system as claimed in claim 17, wherein the first network node is further configured to enqueue the network message at a transmit queue of each of the one or more physical links such that, on the physical layer switch entering its first mode, the network message is transmitted over the one or more physical links in accordance with the selected physical layer protocol.

21. A system as claimed in claim 17, wherein each of the transmit queue(s) is supported in hardware at a network interface device, each transmit queue being at that network interface device providing the network port corresponding to the respective one of the one or more physical links.

22. A system as claimed in claim 17, wherein the first network node is configured to apply the selected physical layer protocol to two or more physical links and to enqueue copies of the network message at transmit queues corresponding to each of the two or more physical links such that, on the physical layer switch entering its first mode, the network message is transmitted in parallel over the physical links.

23. A system as claimed in claim 22, wherein the second network node is configured to, on receiving copies of the network message over the two or more physical links, keep only that network message received first at the second network node and to discard all those copies of the network message that are subsequently received.

24. A system as claimed in claim 23, wherein the first network node is configured to include a sequence number with each network message it transmits such that duplicate network messages all sharing the same sequence number, and the second network node is configured to use the sequence number to identify duplicate network messages that are to be discarded.

25. A system as claimed in claim 17, wherein the at least some of the physical layer protocols of the predetermined set of physical layer protocols are of the same type of physical layer protocol but defined so as to operate at different line speeds.

26. A system as claimed in claim 17, wherein the at least some of the physical layer protocols of the predetermined set of physical layer protocols are of the same type of physical layer protocol but defined so as to operate with different compression schemes, and the estimate of the time required to, for each of the predetermined set of physical layer protocols, transmit the entire network message over that respective network connection includes the time required to decompress the network message were it compressed in accordance the compression scheme of the respective physical layer protocol.

27. A system as claimed in claim 26, wherein the compression schemes include deflate, LZW, and no compression.

28. A system as claimed in claim 17, wherein the selection of the physical layer protocol by the first network node is performed independently of the type of physical interfaces of the one or more physical links, the first network node is operable to select any of the set of physical layer protocols for use over any of the plurality of physical links.

29. A system as claimed in claim 28, wherein the selected physical layer protocol for a given physical link is any of 100BASE-TX, 10GBASE-T and Serial RS-485, and the physical interfaces of that physical link are Ethernet RJ45.

30. A system as claimed in claim 17, wherein the second network node further provides a link to a data network over which the destination network endpoint of the network message is accessible, the data network supporting communications according to a predetermined set of communication protocols, and the second network node is configured to convert the network message into data packets formed in accordance with the predetermined set of communication protocols.

31. A system as claimed in claim 30, wherein the second network node is configured to store information representing headers for the data packets formed in accordance with the predetermined set of communication protocols such that the second network node is operable to convert the network message into data packets without requiring substantial generation of the headers of the data packets in accordance with the predetermined set of communication protocols.

32. A system as claimed in claim 17, wherein the first or second network node is configured to form a first timestamp on the physical layer switch entering its first mode and the second network node is configured to form a second timestamp on the network message being received at the second network node, the first or second network node being configured to estimate from the time elapsed between the first and second timestamps the latency in the transmission of the network message.

33. A system as claimed in claim 32, further comprising a data store comprising data from which the first network node is configured to estimate the total times.

34. A system as claimed in claim 33, wherein the first network node is further operable to update data stored at its data store in response to the estimate of the latency in the transmission of the network message.

35. A system as claimed in claim 17, wherein the first and second network nodes are configured to, on the physical layer switch entering its first mode so as to permit transmission of the network message over the one or more physical links, establish according to the selected physical layer protocol a physical layer connection over at least some of the one or more physical links without substantial re-negotiation of the link parameters of those physical links by using, for each of the at least some of the one or more physical links, a set of stored link parameters defining a previously successful physical layer connection over the respective physical link.

* * * * *